United States Patent Office 2,856,306
Patented Oct. 14, 1958

2,856,306
CELLULOSIC COATINGS FOR VINYL COPOLYMERS

Nancy H. Johnson, Atlanta, Ga., and Charles H. Coney, Kingsport, Tenn., assignors to Eastman Kodak Company, Rochester, N. Y., a corporation of New Jersey No Drawing. Application March 4, 1957
Serial No. 643,892

5 Claims. (Cl. 106—184)

This invention concerns a composition for coating the surface of a vinyl copolymer such as a vinyl chloride-vinyl acetate copolymer.

In the manufacture of vinyl sheeting, it has been found that plasticizers used in the vinyl sheeting tend to migrate leaving the surface brittle and stiff. In articles such as shower curtains, furniture upholstery and the like, this is a disadvantage since the brittle plastic material then tends to crack and break.

Very often it is desirable to lacquer molded plastic surfaces made from copolymers of vinyl acetate and vinyl chloride, in order to produce a pleasing color effect or bring out the outline of printing or a design molded into the object. Unfortunately, some of these coating compositions adhere very poorly and may even cause crazing of the molded surface.

In some instances, it has been desirable to have a harder and more scratch resistant surface on articles made from these copolymers and for that reason alone molded articles have been lacquered.

Various materials have been suggested as lacquers for plastic articles. Coatings of shellac, while soluble in solvents which do not attack these copolymers, are not sufficiently tenacious to give the protection desired. Furthermore, they are soluble in alcoholic cleaning fluids. Cellulose nitrate coatings have been found impractical due to softening and tack because of a higher degree of absorption of plasticizer from the vinyl chloride-vinyl acetate plastic. Ethyl cellulose coatings have also been suggested, and while these possess a considerable resistance to many solvents and to electrostatic influences, they are not very scratch resistant and, some of these have not bonded to the copolymer. Generally, coatings of the prior art which have been dissolved in solvents which are also solvents for polyvinyl-polyacetate copolymers, scratch and cloud the surface so that they are unsuitable for this purpose.

We have found that the use of cellulose acetate butyrate coatings for vinyl copolymers is both protective and decorative. They are protective, since they prevent plasticizer migration from the vinyl copolymer surface and prevent softening of other surfcces which may absorb plasticizer in contact with the vinyl copolymer. They are decorative in that they impart a high gloss to the vinyl copolymer surface. Also, incorporation of pigments or dyes in the cellulose acetate butyrate coating permit the use of single or multiple colors.

One object of this invention is to provide a novel coating for vinyl copolymers which forms an integral bond therewith which imparts to the copolymer improved resistance to scratching, decreased plasticizer migration and enhanced appearance. An additional object is to provide a copolymer of vinyl acetate and vinyl chloride relatively free from plasticizer migration. Another object is to provide a vinyl copolymer sheeting which remains flexible. A further object is to provide a quick drying lacquer which when applied to vinyl copolymers possesses excellent moisture resistance. Another object is to provide a coating which will not become soft and tacky due to plasticizer absorption. An additional object is to provide a lacquer for vinyl copolymers having excellent adherence to the plastic surface.

The above objects are obtained by using a cellulose acetate butyrate lacquer containing a carefully compounded solvent mixture containing dimethylformamide or cyclohexanone. Cellulose acetate butyrate having a butyryl content of from 46-50% is dissolved in a solvent mixture of ethyl acetate, isobutyl acetate, ethyl alcohol, toluene, and dimethylformamide. A small amount of silicone fluid, phenylated dimethyl polysiloxane, may also be incorporated. A short baking time, 1½ minutes at 350° F. insures obtaining maximum adhesion of the cellulose acetate butyrate to the vinyl copolymer.

The following formulation may be used within the range provided:

| Ingredient: | Weight percent of total |
|---|---|
| Cellulose acetate butyrate (butyryl content 46-50%) | 5-30 |
| Silicone fluid | 0.1-2 |
| Ethyl acetate | 5-75 |
| Isobutyl acetate | 5-75 |
| Ethyl alcohol | 5-40 |
| Toluene | 5-75 |
| Dimethyl formamide (or cyclohexanone) | 5-35 |
| | 100 |
| Solids, percent | 18-22 |
| Viscosity, cps. | 4,000-6,000 |

Example 1

A lacquer having the following formula:

| Ingredient | Weight percent of total |
|---|---|
| Cellulose acetate butyrate (butyryl content 46-50%) | 20 |
| Silicone fluid | 0.1 |
| Ethyl acetate | 14 |
| Ethyl alcohol | 7 |
| Toluene | 34.9 |
| Dimethyl formamide | 10 |
| | 100.0 |
| Solids, percent | 20 |
| Viscosity, cps. | 4,000-6,000 | was coated on samples of vinyl copolymers composed of approximately 50 parts of various plasticizers and 100 parts of a copolymer of vinyl acetate and vinyl chloride having about 20% acetate substitution.

Prior to coating, one sample of the copolymer sheeting containing one of the various plasticizers was cleaned with acetone to remove any dirt or grease on the surface. A second similar sample was coated without being cleaned. The coatings were allowed to air dry 16 hours and adhesion tested using Scotch tape. A sample of each coated vinyl copolymer was baked 1½ minutes at 350° F. and the adhesion again determined. Those samples which had good adhesion to the vinyl after baking were immersed in water for 24 hours and the adhesion again checked. A sample of each clean vinyl coated with lacquer was maintained 96 hours at 140° F., and the adhesion determined using Scotch tape. The results of these tests are listed below.

| Vinyl Plasticizer | Initial | | | | 24 Hours Water Immersion | | 96 Hrs. at 140° F. |
|---|---|---|---|---|---|---|---|
| | Not Cleaned | | Cleaned | | Not Cleaned | Cleaned | Cleaned |
| | Not heated | 1½ Min., 350° F. | Not heated | 1½ Min., 350° F. | 1½ Min., 350° F. | 1½ Min., 350° F. | 1½ Min., 350° F. |
| Bis-(2-Ethyl Isohexyl Phthalate) | P | G | G | G | G | G | G |
| Mixed Alcohol Phthalate | P | G | G | G | G | G | G |
| High Molecular Weight Phthalate | P | G | F | G | G | G | G |
| Decyl Isobutyl Phthalate | P | G | P | G | G | G | G |
| Octyl decyl Phthalate | P | G | P | G | G | G | G |
| Bis-(2-Ethyl Adipate) | G | G | G | G | G | G | G |
| Polyethylene glycol di-(2-ethylhexoate) | G | G | G | G | G | G | G |
| Dinonyl Phthalate | P | G | G | G | G | G | G |

In none of the extended heating tests would the lacquer coating become soft or in any way indicate that it had absorbed a plasticizer from the vinyl film. Whenever there was plasticizer exudation, it always occurred on the uncoated side of the film. The best adhesion was obtained when the coated vinyl was given a 1½ minute baking at 350° F. Also the gloss of the coating was improved by the bake. When the lacquered vinyl were cooled to −40° C. and the flexibility determined by a bend test, the lacquer coatings were equal to the vinyl films in cold flexibility.

The plasticizers used above are those known in the prior art and are not believed to be critical to this invention but are used to illustrate the advantages which are obtained by using our coating composition.

*Example 2*

Samples of commercial vinyl sheet were coated with a lacquer as described in Example 1 except that the dimethyl formamide or cyclohexanone have been omitted or replaced with another high boiling solvent.

Sample:

A_____ Blank.
    B_____ 10% cyclohexanone.
    C_____ 10% dimethyl formamide.
    D_____ Blank.
    E_____ 10% diacetone alcohol.
    F_____ 10% butyl Cellosolve.

After the coatings were applied, the vinyl sheet was baked at 350° F. for 1½ minutes.

The adhesion of the films was determined by scoring through the film with a knife and then applying Scotch tape. Only samples B and C exhibited good adhesion.

The silicone fluid improves the mar resistance of the film but may be omitted. It is a methyl poly siloxane having from 0 to 70% phenyl substitution.

We claim:
1. A coating composition for vinyl copolymers consisting essentially of 5–30% cellulose acetate butyrate having a butyryl content of 46–50%, 5–75% ethyl acetate, 5–75% isobutyl acetate, 5–40% ethyl alcohol, 5–75% toluene and 5–35% cyclohexanone.

2. A vinyl copolymer coated with a lacquer consisting essentially of 5–30% cellulose acetate butyrate having a butyryl content of 46–50%, 5–75% ethyl acetate, 5–75% isobutyl acetate, 5–40% ethyl alcohol, 5–75% toluene and 5–35% cyclohexanone.

3. A process for lacquering a vinyl copolymer support comprising applying a coating composition to the support consisting essentially of 5–30% cellulose acetate butyrate having a butyryl content of 46–50% from a solvent mixture containing 5–75% ethyl acetate, 5–75% isobutyl acetate, 5–40% ethyl alcohol, 5–75% toluene and 5–35% cyclohexanone.

4. A process according to claim 3 in which the lacquered support is dried and heated to approximately 350° F. for 1½ minutes.

5. A vinyl copolymer support lacquered according to claim 4.

References Cited in the file of this patent
UNITED STATES PATENTS

| 2,584,892 | Lord | Feb. 5, 1952 |
| 2,652,339 | Yaeger | Sept. 15, 1953 |

FOREIGN PATENTS

| 482,836 | Great Britain | Apr. 5, 1938 |

OTHER REFERENCES

Payne: "Organic Coating Technology," vol. I, 1954, pp. 447–456.